May 17, 1955
M. MAUL
2,708,514
RECORD CARD CONTROLLED MACHINE
Filed April 17, 1952
11 Sheets-Sheet 1
Fig.1
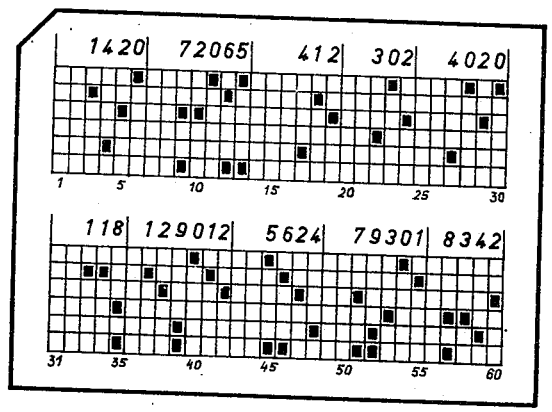
Fig.2
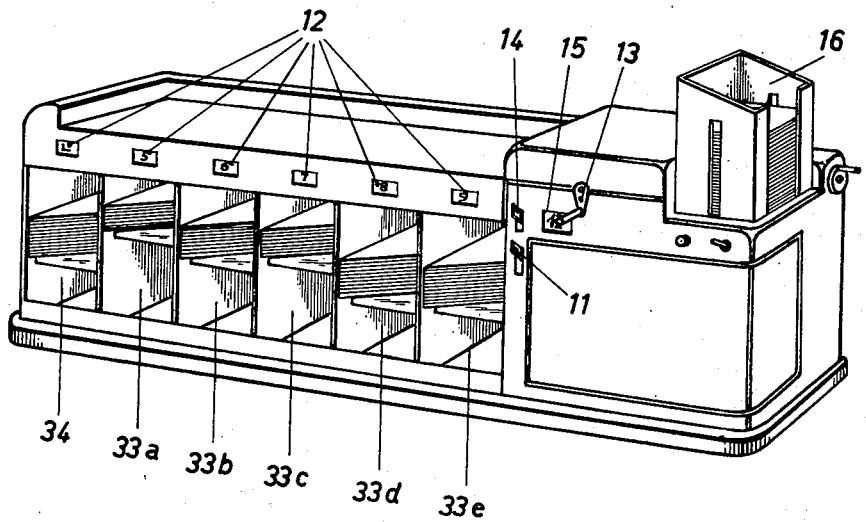
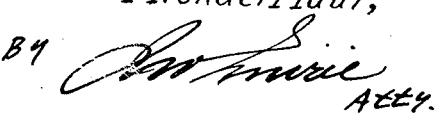

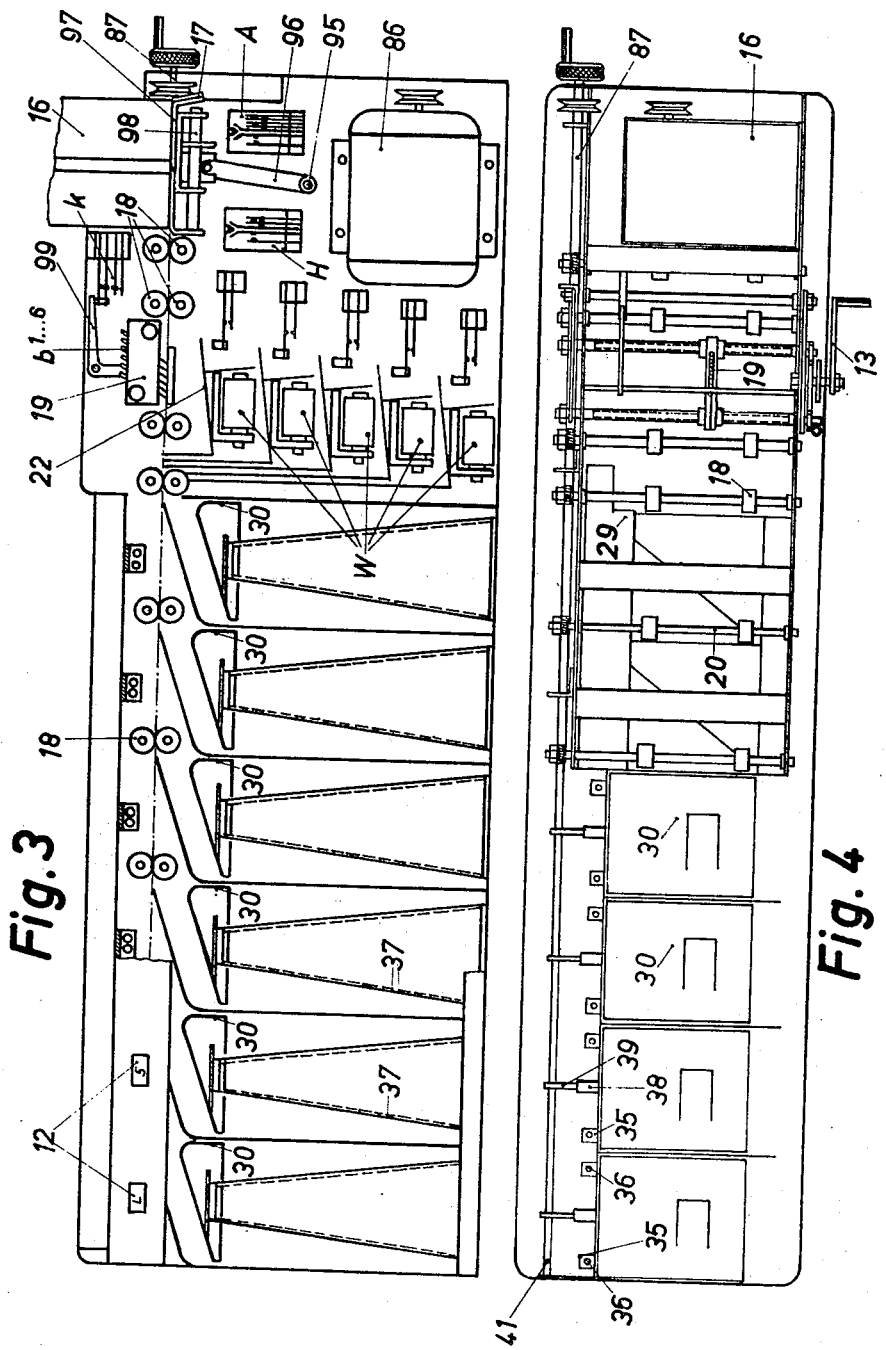

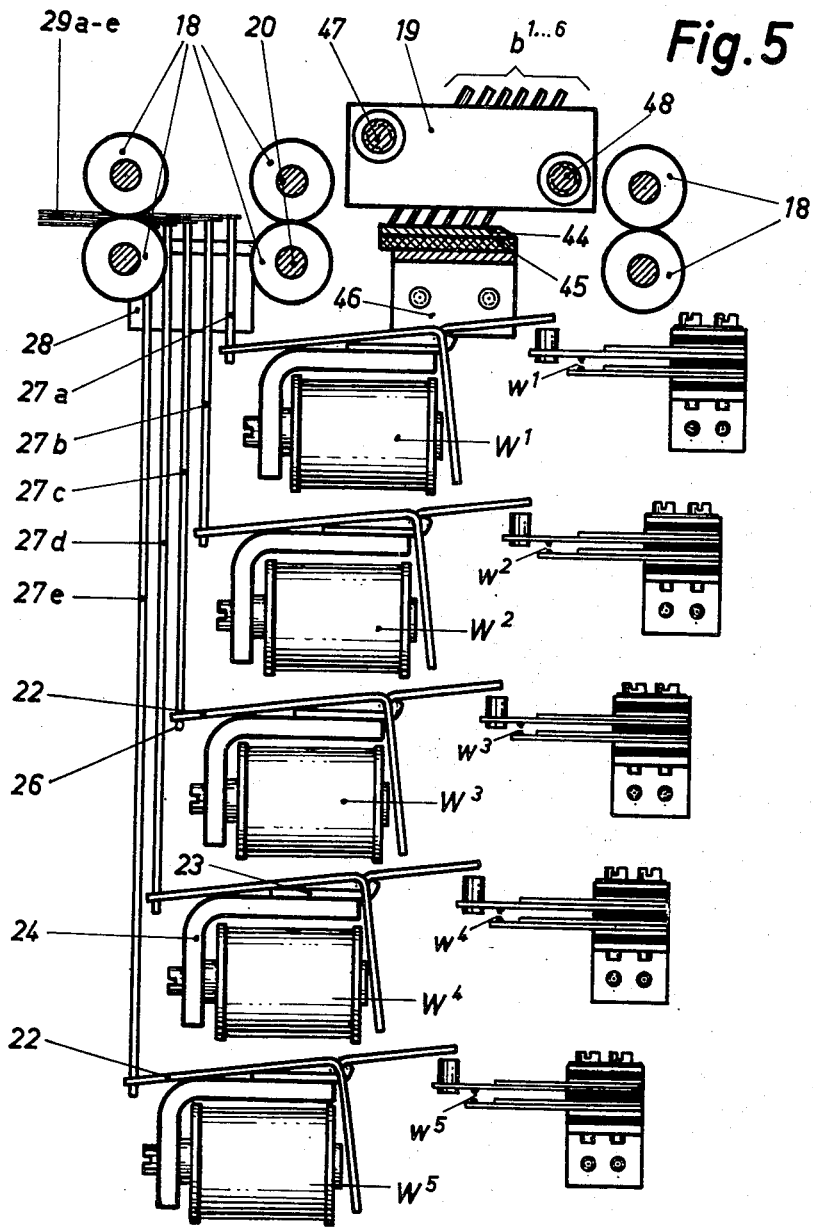

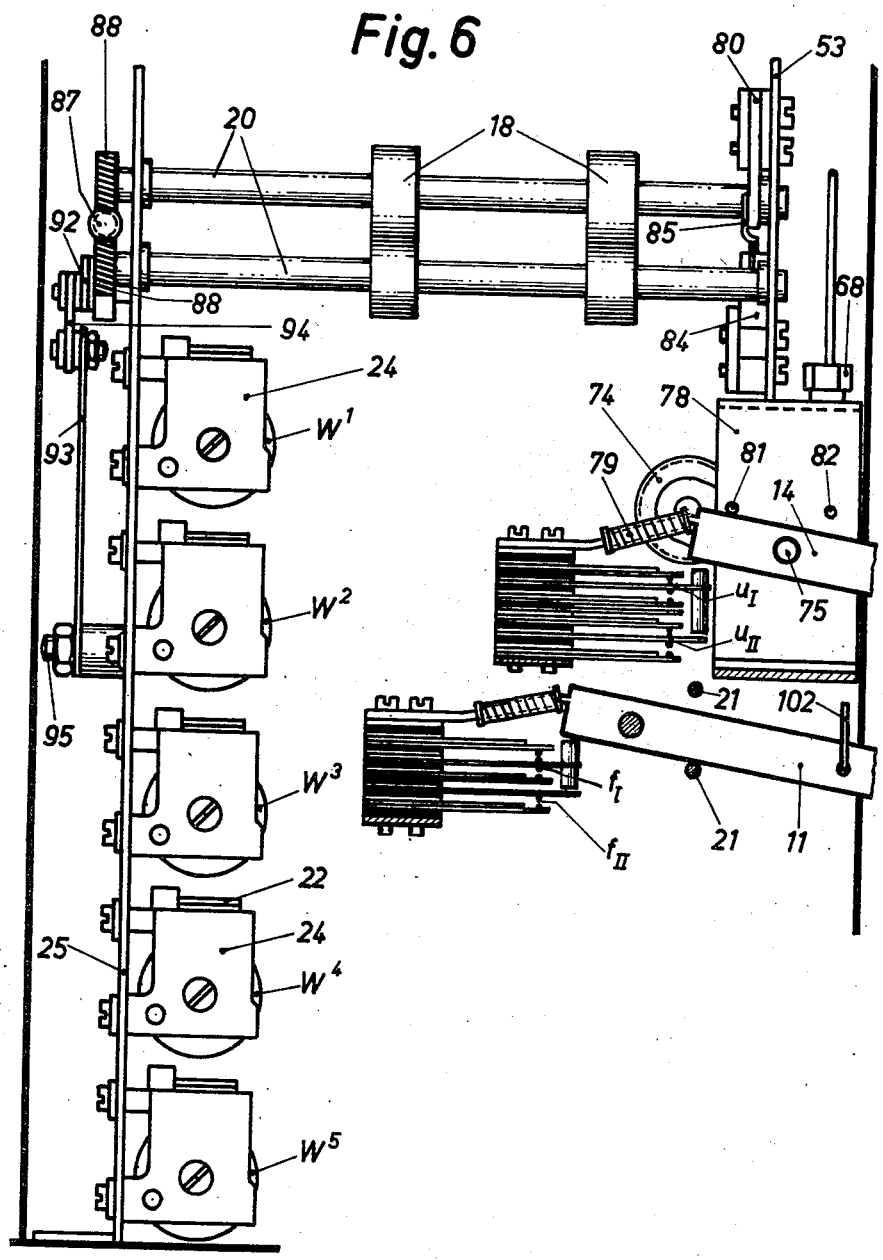

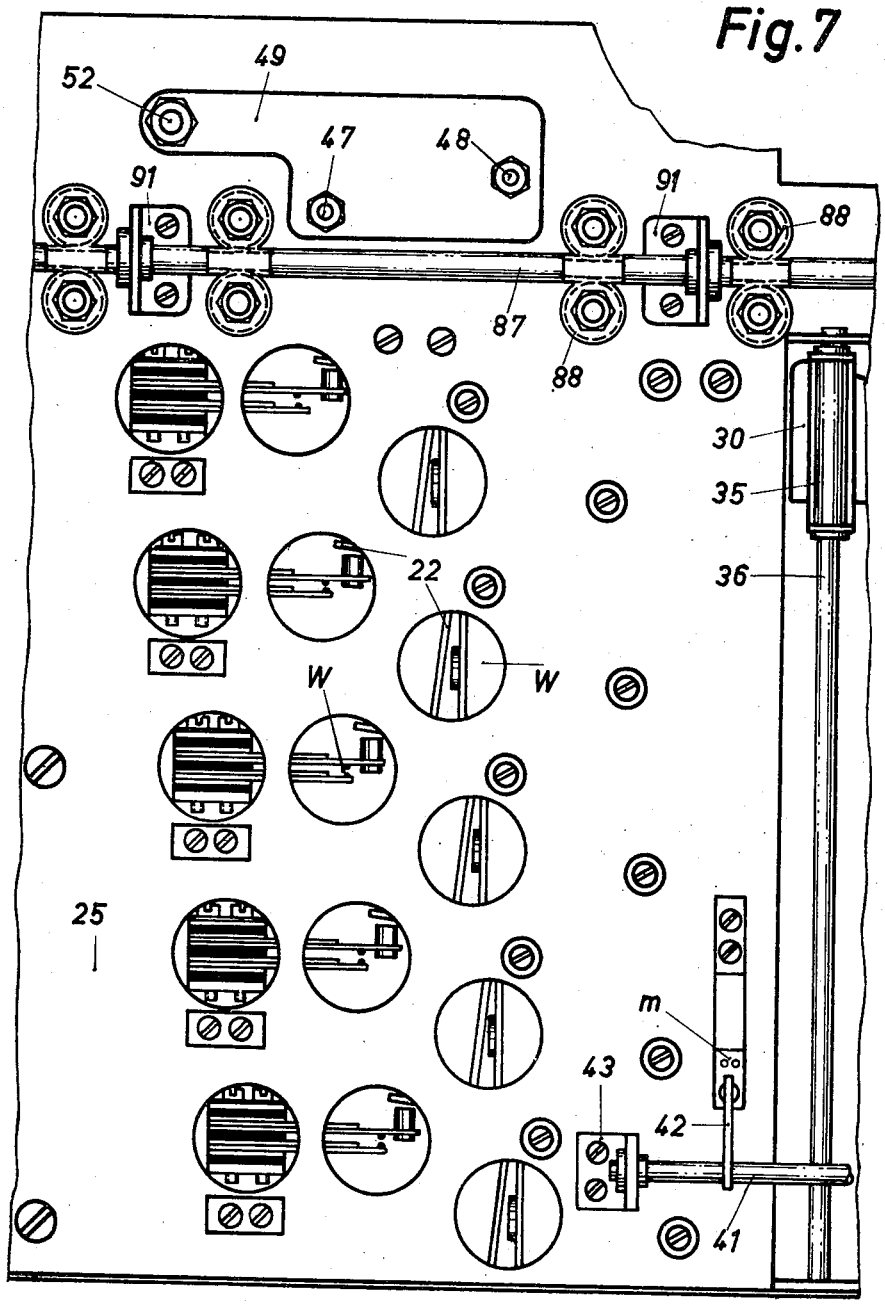

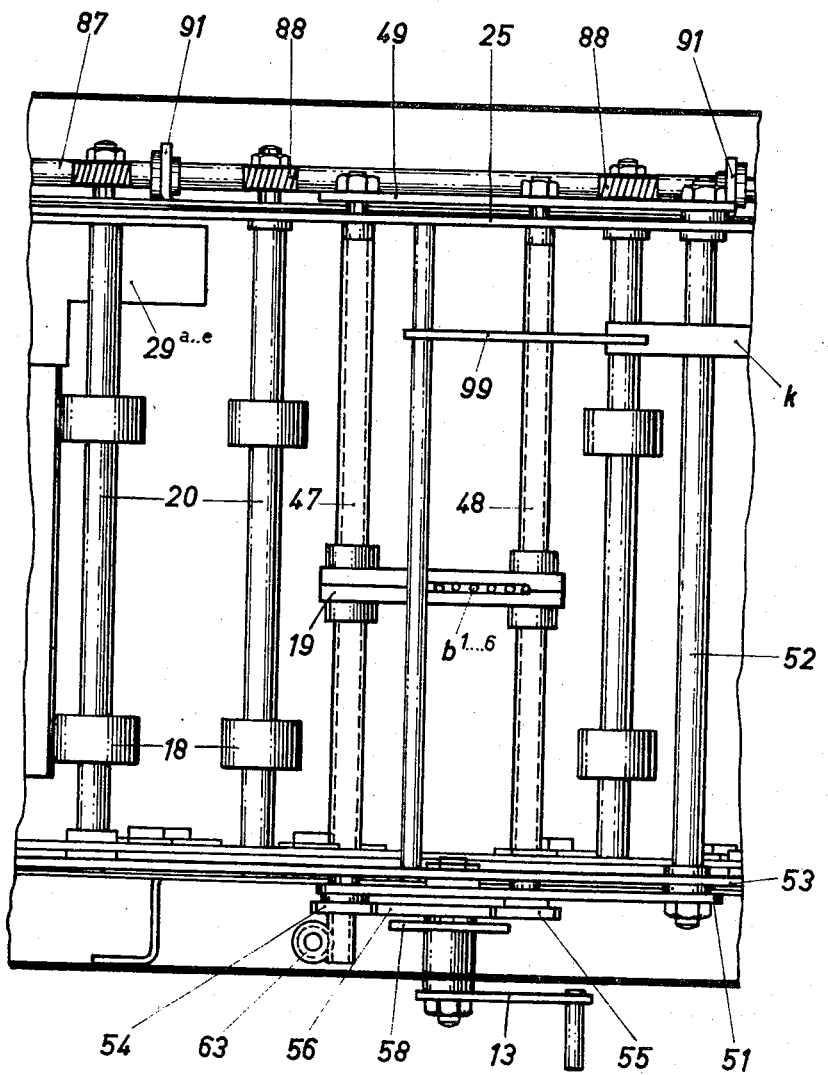

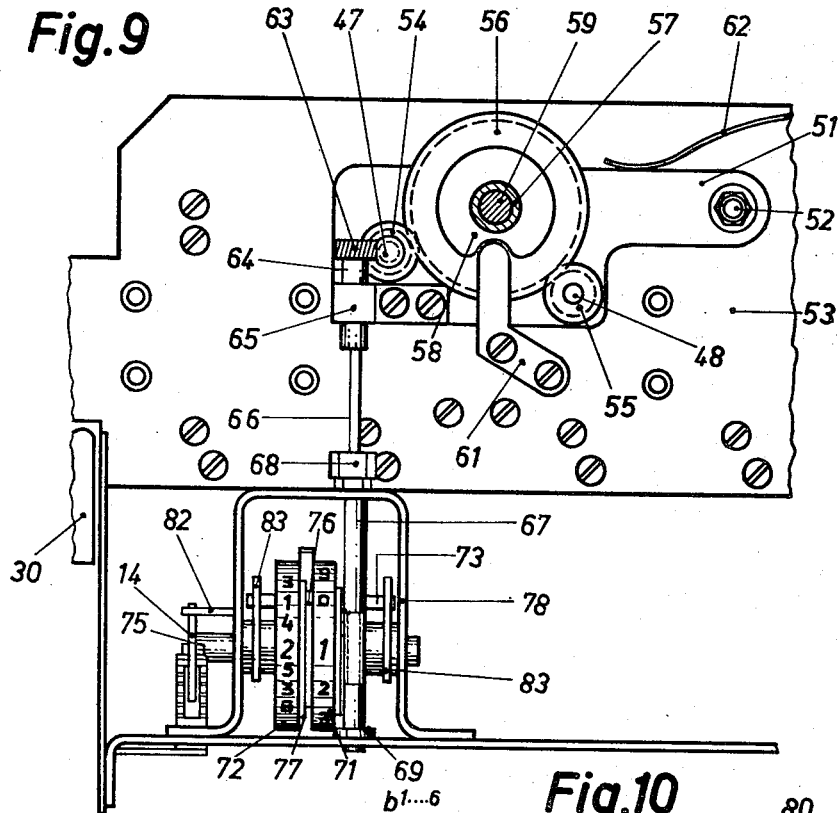
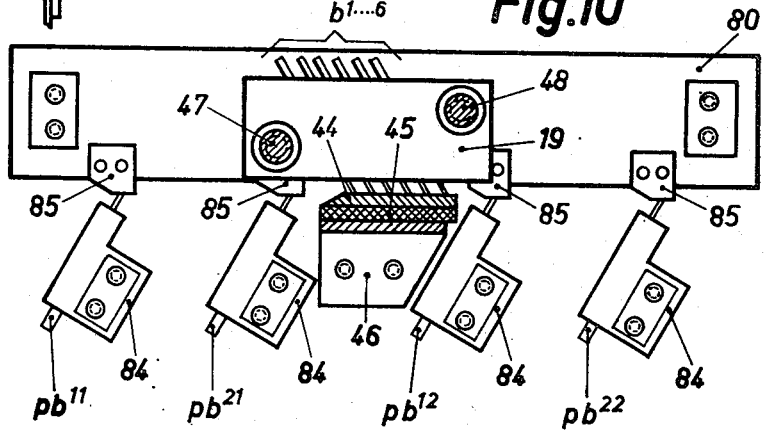

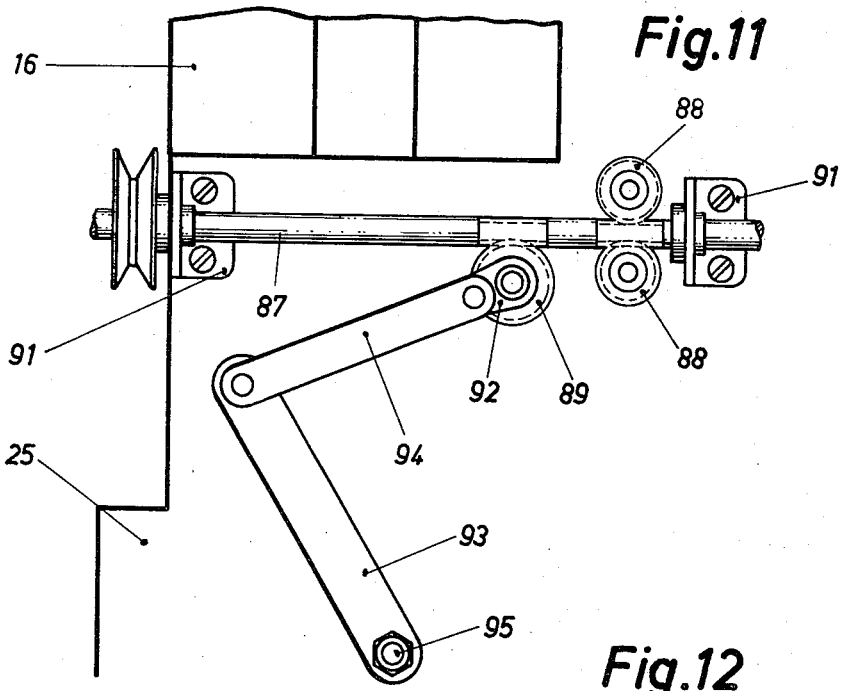
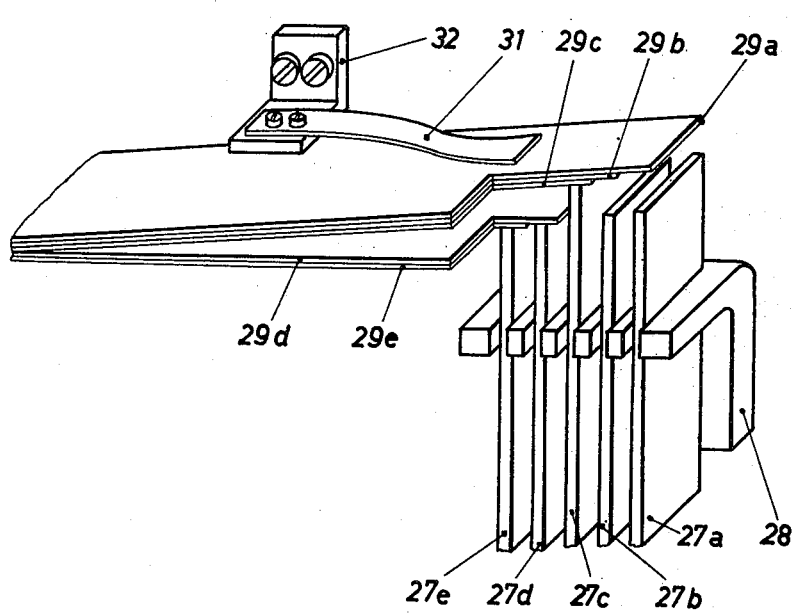

May 17, 1955
M. MAUL
2,708,514
RECORD CARD CONTROLLED MACHINE
Filed April 17, 1952
11 Sheets-Sheet 9
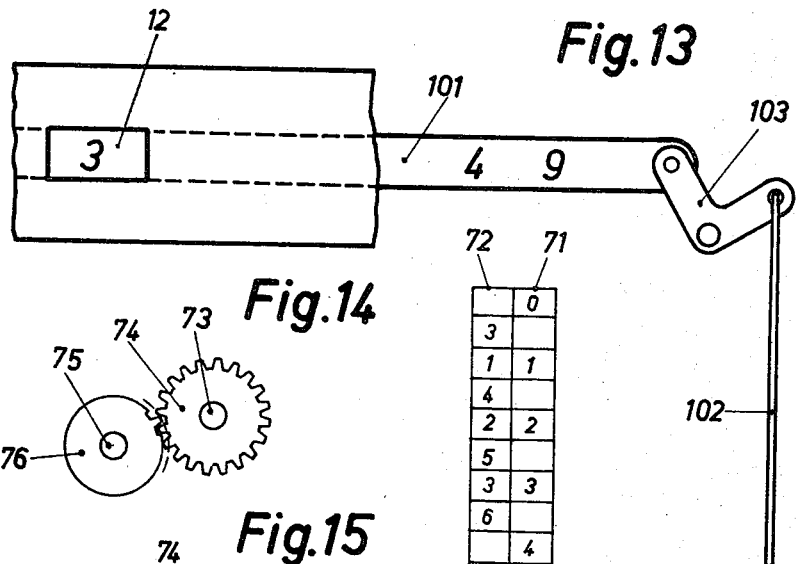
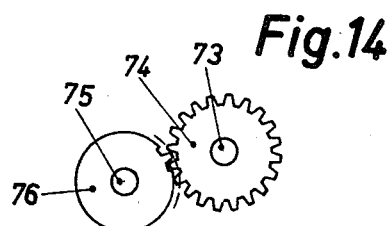
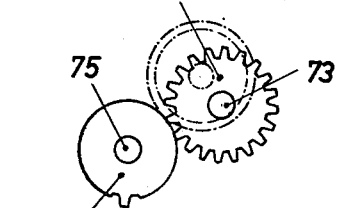
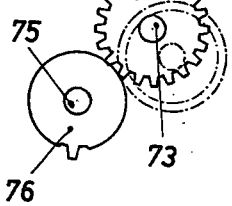
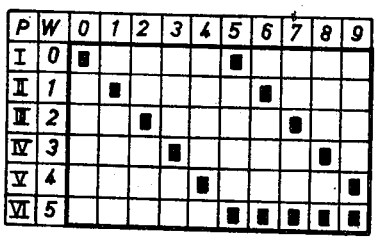
Inventor:
Michael Maul, May 17, 1955   M. MAUL   2,708,514
RECORD CARD CONTROLLED MACHINE
Filed April 17, 1952   11 Sheets-Sheet 10

Inventor:
Michael Maul,
By [signature]
Atty.

May 17, 1955 — M. MAUL — 2,708,514
RECORD CARD CONTROLLED MACHINE
Filed April 17, 1952 — 11 Sheets-Sheet 11
Fig. 19
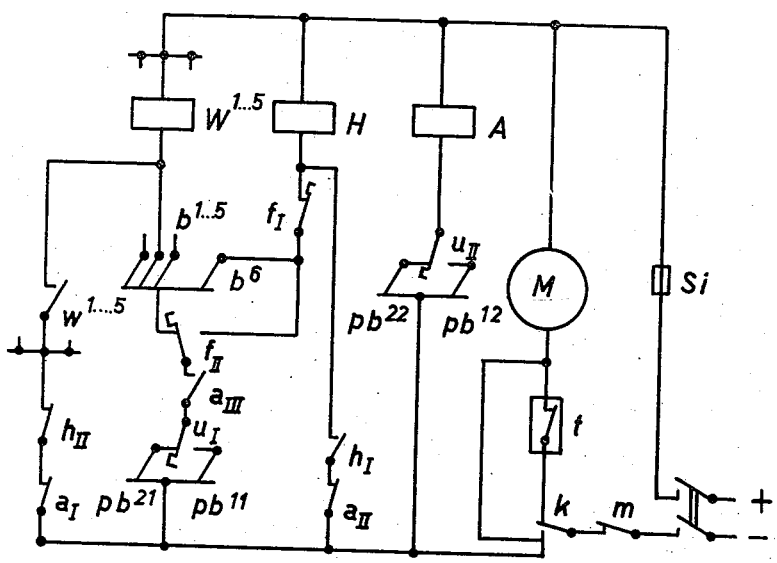
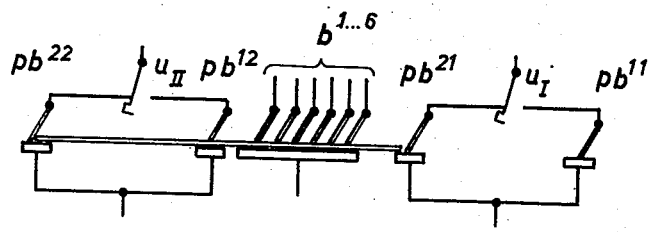
Fig. 20
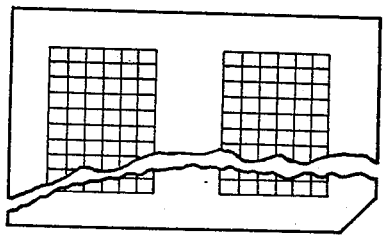
Inventor:
Michael Maul,

United States Patent Office 2,708,514
Patented May 17, 1955

2,708,514

RECORD CARD CONTROLLED MACHINE

Michael Maul, Schwabach, near Nurnberg, Germany

Application April 17, 1952, Serial No. 282,777

Claims priority, application Germany April 30, 1951

13 Claims. (Cl. 209—110)

The present invention relates to a record card controlled machine preferably constructed as a perforated record card controlled machine; however, the inventive idea may also be applied to record cards with any type of index marks in connection with an analyzing device necessary for that particular type of index marking.

On one hand the invention relates to a sorting machine for record cards in which the cards are fed to the sorting pockets one by one from a card magazine and in which, in a predetermined analyzing position, all index mark positions of a card column or of a character are simultaneously analyzed and sorting deflector control takes place in accordance with the result of the analysis.

The essential feature of the invention in such a sorting machine consists in that a pair of position-checking analyzers searching a non-marked card portion is arranged with respect to the sorting marks analyzers in such way that the card is between the position-checking analyzers when it is exactly in analyzing position under the sorting analyzers and that at this moment the latter are made effective instantaneously by the position-checking analyzers for the purpose of the analysis of the character. The sorting deflectors are then electromagnetically opened under the control of the sorting analyzers in accordance with the analyzed character. Opening of the sorting deflectors is maintained independently of the driving means of the machine by an electrical holding circuit until the card has reached the sorting opening and the holding circuit is interrupted by the card itself through the position-checking analyzers before the next card reaches the analyzing position between the position-checking analyzers.

This arrangement permits an extraordinarily reliable machine which is safe in operation and which does not need continual re-adjustment. The above indicated manner of operation permits an absolute "synchronous-less" operation wherein the card itself controls all controlling operations. Therefore, it is also not necessary that any controlling cams, commutators, card knives and the like must be adjusted to predetermined positions relatively to each other which must be checked often and on which adjustment the faultless operation of the machine is dependent. The machine according to the invention is therefore particularly adapted to small and medium sized enterprises in which specialized expert personnel are not always available. This adaptability to small and medium sized enterprises is particularly increased by the fact that the advantages of the described manner of operation work out particularly favorably if the machine has a small number of pockets. Therefore sorting according to numerals is preferably effected in a machine with five numeral pockets plus one reject pocket. Sorting takes place in such manner that in a first sorting run the numerals 0 to 4 and in a second sorting run the numerals 5 to 9 are sorted, wherein for the selection of one sorting run preferably a so-called "over punched hole" is used. Sorting out of all characters of a row of characters in a plurality of sorting runs is known in Hollerith-machines for the purpose of alphabet-sorting in which method the over punched hole determines the sorting run. In the case of the invention, however, the application of this method to sorting according to numerical characters leads to a sorting machine particularly adapted to be used as a small type machine.

On the other hand the invention also consists in that it provides a record card controlled machine of the type mentioned in the introduction wherein analysis is instantaneously controlled by the position-checking brushes between which the card is just passing when the index mark positions are under the index mark analyzers associated with the index mark positions, and that through an analyzing device also controlled exclusively by the card itself a braking magnet is energized shortly before the card reaches the analyzing position, said braking magnet braking the card feeding mechanism until the card has been analyzed and which is then automatically deenergized under card control.

This provision, which is by no means restricted to sorting machines, affords in the described type of machines the particular advantage that the card speed can be reduced shortly before the analysis proper takes place, so that the analysis period and therefore, in the case of electrical analysis, the time available for the controlling magnets is increased. Since the analysis takes place only during a short fraction of the card cycle the reduction in the card speed during the analysis will scarcely have any effect upon the efficiency of the sorting machine. The card speed may be kept high before and after analysis whereby the efficiency of the machine can be considerably increased.

The braking mechanism mentioned above may be applied to the most varied types of record card controlled machine as far as analysis of all index mark positions of a character or of a column takes place simultaneously. However, it can be applied with particular advantage to the sorting machine mentioned above wherein the efficiency may be doubled by reducing the card speed during the short period of analysis. The same may be attained when applying the invention to other sorting machines (for instance according to German Patent 764,849). Another possibility of applying the above mentioned braking mechanism would be for instance in a tabulating machine for hole combinations wherein all index marks are analyzed simultaneously and wherein for instance the analyzers control translator magnets. With the application of the invention analysis would then not be effected by impulse emission by means of an impulse emission device running synchronously with the card feeding means but by the position-checking brushes at the moment when the card is between the same and consequently the hole positions are under the analyzing brushes associated with said positions. The translator magnets controlled by the analyzing brushes may select one of a plurality of contact paths which corresponds to the analyzed character. When the invention is applied to such an embodiment the braking magnet would have to become effective instantaneously before the analysis and would reduce the card feeding speed, thereby permitting, however, the analysis of a greater number of cards.

Further particular features of the invention which may be applied to the sorting machine of the above mentioned type as well as generally in a record card controlled machine provided with a braking device are as follows.

It is possible in both machines to use cards with a plurality of superpositioned record decks and to govern the deck selection by means of the position-checking brushes. The controlling brush for the braking magnet may also be included in the deck selection.

Further preferred features of the invention will be seen from the following specification, the drawings and particularly from the claims.

Fig. 1 shows a perforated record card as used in the machine described herein.

Fig. 2 shows a perspective general view of the machine.

Fig. 3 shows the whole machine in section.

Fig. 4 shows the whole machine from above in section and in plan.

Fig. 5 shows particularly the details of the card analysis and the adjusting magnets for the sorting deflectors.

Fig. 6 shows the mounting of the adjusting magnets, the operating levers for pocket and column shifting as well as the associated contacts.

Fig. 7 shows a part of the rear wall of the machine with the roller drive and the recesses for observation of the magnets and contacts.

Fig. 8 shows a plan view of the analyzing device.

Fig. 9 shows a part of the machine in front elevation with the cover removed, said part containing the device for shifting the brushes as well as the column indicating means.

Fig. 10 shows as a detail once more the analyzing device with the position-checking brushes.

Fig. 11 shows the drive for the card knives.

Fig. 12 shows in perspective the sorting deflectors upon energization of a sorting magnet.

Fig. 13 shows a part of the pocket indication.

Figs. 14 to 17 relate to the column indicating means.

Fig. 14 shows the operation of the tens-transfer for the column indicating means.

Fig. 15 shows the position of the tens-transfer wheel on selection of the lower deck.

Fig. 16 shows the position of the tens-transfer wheel on selection of the upper deck.

Fig. 17 shows in development the distribution of the characters upon the circumference of both indicator-wheels.

Fig. 18 shows the perforation code according to which the machine operates.

Fig. 19 shows the circuit diagram.

Fig. 20 shows particularly the arrangement of the position-checking brushes relative to the card and the sorting brushes.

Figure 21:
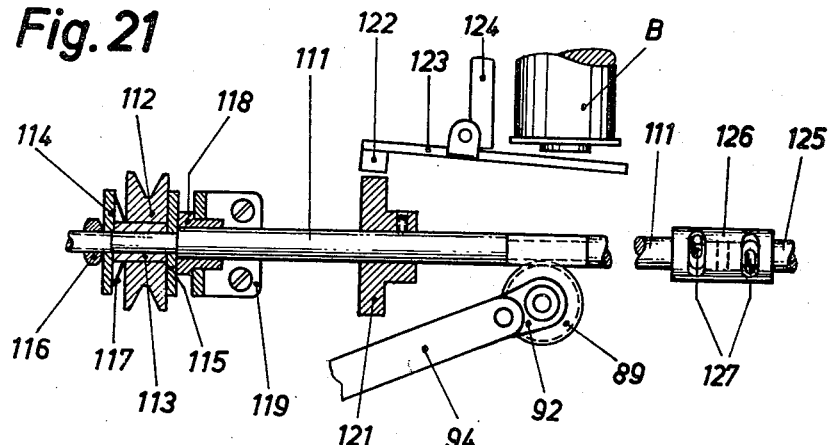

Fig. 21 shows the braking mechanism for the feed rollers for increasing the analyzing period.

Figure 22:
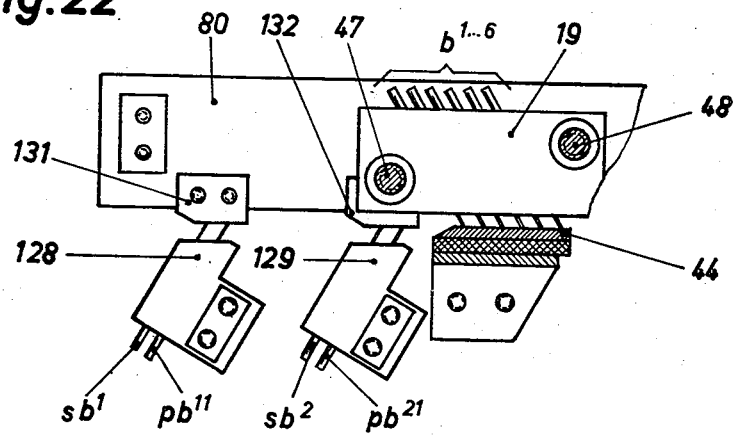

Fig. 22 shows the braking magnet brushes serving for the control of the braking magnet.

Figure 23:
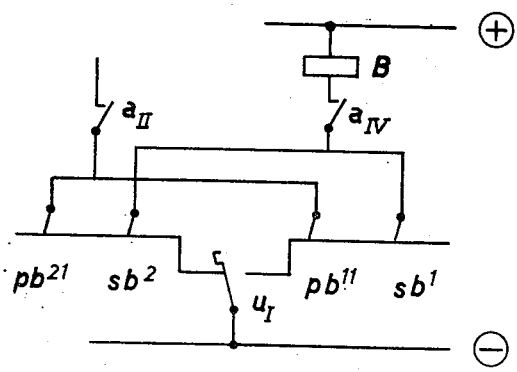

Fig. 23 shows a part of the circuit diagram with the inclusion of the braking magnet.

General explanations

The machine operates upon a card as shown in Fig. 1. The card has two decks each consisting of 30 columns and each column comprising 6 hole positions. The card will be punched according to the code shown in Fig. 18. To each position there is associated a predetermined value. In Fig. 18 these values are indicated in column W for the positions I to VI which are indicated in column P. The numeral 5 and those above it are represented by one of the values 0 to 4 and also an additionally punched value, the so called "overhole" having the value 5. This code permits particularly a simple sorting in two runs so that the machine needs only five sorting pockets and a reject pocket. Sorting takes place in the first run (lever 11—Fig. 2—in lower position) from 0 to 4 wherein all cards having a five-hole are excluded from sorting and are deposited in the reject pocket. The lever 11 (Fig. 2) is then shifted upward thereby actuating the contacts $f_I$ and $f_{II}$ (Fig. 6) which will be referred to later in the description of the circuit diagram. Now, the sorting device having first sorted the cards with the numerals 0 to 4 and having eliminated those with a five-hole into the reject pocket, is shifted in such manner as to permit sorting of cards which have a five-hole in addition to one of the holes 0–4, while other cards have no influence upon the sorting device. If the operation has been carried out correctly such cards are not present since they have already been sorted out during the first run. If, inadvertently any cards 0 to 4 should still be present they are deposited into the reject pocket. Together with the shifting of the sorting device the pocket indication 12 (Figs. 2 and 13) is also shifted which indicates in each instance which perforated characters are deposited in the pockets.

Positioning of the analyzing device upon the respective column is effected by a crank 13 (Fig. 2), and shifting from the upper deck to the lower deck by a lever 14. The number of the column upon which the brushes are positioned may be read from a column indication 15. Upon shifting the deck the column indication is also automatically shifted as will be described in detail below.

Construction of the machine

The unsorted cards are deposited in a magazine 16 and are moved by card knives 17 (Fig. 3) between feed rollers 18 feeding the card past the analyzing devices and to the sorting pockets. The analyzing device for the sorting pockets consists of a set of brushes 19 (Fig. 5) with six sorting brushes $b^1$ to $b^6$ arranged one behind the other. Selector magnets $W^1$ to $W^5$ are connected to the first five brushes analyzing the positions I to V (Fig. 18) while for the selection of the sorting run the sixth brush $b^6$ controls a relay H. Depending upon the perforation one of the selector magnets will be energized and will attract its armature 22 against the tension of a spring 23, the latter keeping the armature in its rest position. The spring is fastened to a yoke 24. The magnets $W^1$ to $W^5$ are fastened by means of the yoke 24 to the rear wall 25 (Figs. 6 and 7) of the machine. Studs 26 on bars 27a to 27e engage in the left hand ends of the armatures 22. The bars can slide with their upper ends in the guide 28. Each bar 27a to 27e engages card deflectors 29a to 29e (Fig. 12) outside the card edge. If the armature 22 of a magnet is attracted the associated bar 27 will be pressed upward and will consequently engage the deflector 29 as well as those above it. The deflectors below will remain in the rest position. Thereby an opening will be provided into which the card is moved by the rollers 18 and fed to the corresponding sorting pockets 33a and 33e. It will be seen from Fig. 12 that the ends of the sorting deflectors are provided in such manner that the bars engage on the outer halves of the deflectors where the ends of the deflectors are arranged in staggered relation. At their inner halves, which serve to guide the cards, the deflectors however, terminate directly above each other. If none of the selector magnets responds, none of the sorting deflectors will be opened and the card will pass over the same to the reject pocket 34.

If the armature 22 returns to its home position, the bar 27 and the deflectors 29 are brought to their initial positions by a spring 31. Spring 31 is fastened by means of angles 32 to the rear wall of the machine. The armature 22 (Fig. 5) actuates with its right hand end the contacts $w^1$ to $w^5$ the function of which will be referred to later on in the description of the circuit diagram. In order to permit easy assembling and adjusting of armatures and contacts, recesses (Fig. 7) are provided in the rear wall permitting observation of the selector magnets and their contacts.

In the sorting pockets there are provided special card supports 30. They are guided by means of angles 35 (Figs. 4 and 7) on pins 36 and pressed upward by springs 37. The springs 37 are so arranged that they will resiliently yield in accordance with the weight of the card. In addition on each card support there is provided an angle 38 engaging an associated lever 39 when the support reaches the lowermost position. The lever 39 is fast upon a shaft 41 adapted to open a contact $m$ by means of a lever 42 (Fig. 7). There is an individual lever 39 provided for each pocket. Now, if any pocket is filled with cards the angle 38 will encounter the lever 39, will rock the same and therewith the lever 42, which latter will open the contact $m$ thereby stopping the machine. The shaft 39 is mounted in two angles 43.

Analysis of the sorting column is effected by the set of brushes 19 comprising brushes $b^1$ to $b^6$ (Figs. 5 and 10). The brushes are supplied with current from a contact plate 44 which is fixed to an insulating plate 45 mounted on a stirrup 46 attached to walls of the machine. If the set of brushes is adjusted from one column to another column, the brushes are raised from the contact plate. The set of brushes 19 is held by two screw-threaded shafts 47 and 48 mounted in arms 49 and 51 (Figs. 7, 8, 9). The two arms are fast upon a shaft 52 which is pivotally mounted in two side walls 25 and 53. On the front ends of the two screw threaded shafts are fixed pinions 54 and 55 which engage with a toothed wheel 56. The ratio of the gears as well as the pitch of the screw-threaded shafts has been chosen in such manner that one revolution of the gear 56 will displace the set of brushes one column pitch. The gear 56 is fast upon a sleeve 57 upon which are pressed also a cam disk 58 and the crank 13. The sleeve 57 is loosely mounted on a stud 59 which is fast upon an arm 51. The cam disk 58 is pressed by a spring 62 on to a locking finger 61. If the crank is turned this will also take with it the cam disk which will be raised according to the shape of the cam thereby rocking the arms 49 and 51 upward. In this instance the brushes are raised and will remain raised until a locking finger 61 again engages in the recess of the cam disk. In the meantime the brushes have reached the next card column.

The front end of the screw-threaded shaft 47 (Figs. 8 and 9) is contructed as a worm and acts upon a worm wheel 63 from which the movement for the column indication is derived. The worm wheel 63 is mounted in a sleeve 64 which is fixed by a strap 65 to the arm 51. The worm wheel 63 is rotatable in the sleeve but secured against displacement. The lower end of the boss of wheel 63 engages the upper end of pin 66 after the manner of a clutch, said pin being constructed in such a way that upon rotation of wheel 63 the pin will be moved with it, however, the clutch will not be released upon shifting of the brushes. Pin 66 is connected by its lower end to a worm shaft 67. The upper part of the worm shaft 67 is mounted in a sleeve 68 and the lower part thereof is mounted in a sleeve 69. The worm shaft drives through its worm a worm wheel (not illustrated) which is rigidly connected to an indicator wheel 71. The ratio has been chosen in such manner that the movement of the sorting brushes through one column pitch causes turning of the indicator wheel through one tenth of its circumference. The indicator wheel 72 is driven by wheel 71 through idle gears and through a tens-transfer device in known manner.

If now the machine is shifted from one deck to the other one, the indication must change. From Fig. 1 it follows that the units in the column numbers indicated under each deck are the same in the upper as well as in the lower deck for the same column position. Shifting must therefore only affect the tens-wheel. If the distribution of the numbers upon the circumference of the indicator wheels is chosen as indicated in Fig. 17 a simple shifting device is obtained.

The distribution upon the units wheel has been determined in such a way that there is a blank position between two numbers on the units wheel. This space is then made use of in the tens wheel 72. Accordingly, when tens transfer occurs, the tens wheel is shifted through two digit spaces (Fig. 14). The distribution of the digits on the tens wheel has been chosen in such manner that the digits of the upper deck and the lower deck are alternately arranged. Therefore, for the purpose of deck selection it is only necessary to rock the tens wheel for half a step with respect to the units wheel. This rotation of half a step is obtained by rocking of the tens transfer wheel 74 (Figs. 14 to 16) with its shaft 73 around a spindle 75. Upon the spindle 75 there are also rotatably mounted the indicator wheels 71 and 72 (Figs. 9, 15 and 16). A wheel 76 is fast to the units wheel 71 and has only one tooth. Over the remainder of the circumference the diameter is sufficiently large that the tens transfer wheel 74 is locked against rotation with respect to wheel 76.

The tens transfer wheel 74 is formed as a normal toothed wheel with 20 teeth. If the tooth of the wheel 76 moves past the tens transfer wheel the latter will be rotated for 2 teeth or one tenth of the circumference (Fig. 14). Fast to the tens transfer wheel 72 is a pinion 77 (Fig. 9) engaging the tens transfer wheel 74 and having a 1:1 ratio with regard to the same. If now the tens transfer wheel is rocked as has been described, it will remain nevertheless blocked by wheel 76 and cannot rotate around its axis. This will positively cause the gear or pinion 77 of the tens wheel to be moved through the angle through which the tens transfer wheel has been rocked. The angle of rotation is such that it amounts to half a step of the tens transfer. By this means the tens wheel will be turned one digit space as has already been described. In this rocking movement the time of occurrance of the tens transfer has been somewhat varied but this has no influence upon the final adjustment since this variation will only work out within the step. Therefore upon shifting, the tens transfer mechanism is moved for the last half upon the first half of the step or vice versa.

The above described rocking is effected by lever 14 (Figs. 1, 6 and 9) mounted fast upon the shaft 75. The shaft 75 is mounted in a stirrup 78 accommodating the whole column indicating device. The lever 14 is held by a spring 79 in one of two positions to which it can be rocked said positions being determined by two stops 81 and 82. Upon the shaft 75 are also fast two arms 83 (Fig. 9) serving as bearings for the shaft 73 of the tens transfer wheel 74. The lever 14 actuates in the one position the two shift contacts $u_\mathrm{I}$ and $u_\mathrm{II}$ which shift the position-checking brushes $pb^{11}/pb^{12}$ upon $pb^{21}/pb^{22}$. The position-checking brushes are arranged in such manner that the card is just between the same when the sorting brushes $b^1$ to $b^6$ are analyzing the hole positions of a card column. At this moment they also render effective the sorting brushes. Due to this arrangement the whole machine becomes independent of cam control and synchronism.

In order to avoid sparking the sorting brushes should not be permanently connected to electrical potential. This is generally prevented thereby that at the moment at which the hole positions are under the brushes a short current impulse is sent through the brushes provided that there is a hole thereunder. Termination of the impulse is effected by the position-checking brushes. They are constructed in such a manner that the current can flow through the analyzing brushes only if both position-checking brushes are not upon the card. The description of the current flow will follow later in connection with the specification of the circuit diagram.

When the deck is changed, the position of the position-checking brushes must be changed relative to the sorting brushes. This can be effected by moving the set of sorting brushes with respect to the position checking brushes or vice versa. Mechanical moving, however, involves a considerable complication. Therefore in the preferred embodiment there are provided two sets of position-checking brushes fixed to the rear wall of the machine and spaced apart by the distance between the two decks. When the deck is shifted they are shifted electrically as has already been described. The position-checking brushes are secured by means of their holders 84 (Figs. 6 and 10) to the front wall 53 of the machine by means of screws. The screws pass through larger holes in the front wall whereby adjusting of the brushes within certain limits is possible. Current is supplied to the brushes from the angles 85 riveted to the insulating bar 80 which is also rigidly screwed to the front wall of the machine. Driving of the machine is effected by motor 86 through a belt and through a worm shaft 87 (Figs. 3 and 11). The feed rollers 18 are driven by the worm shaft through worm gears 88 and the crank drive for the card knives is driven through a worm gear 89. The worm shaft 87 is mounted in angles 91. The worm wheel 89 is fast to crank 92 to which rocker 93 is linked through a link 94. The rocker 93 is fast upon a shaft 95 upon which is also fast a lever 96 (Fig. 3). The lever 96 engages into a lip of the slide 97 which is guided in pins 98 and carries the card knives 17.

In the machine there is provided in a known manner a special card lever 99 actuating its contact $k$. The card lever serves the purpose of determining whether there are cards under the sorting brushes. If there are no cards thereunder the contact $k$ is restored to its home position and the machine will be stopped after a predetermined time within which the last card has reached its pocket.

If the machine is shifted to another sorting run the pocket indication must change also. This is obtained by displacing a bar 101 carrying the pocket indication (Fig. 13) behind the pocket indication openings 12, said displacement being effected by the shift lever 11 (Fig. 6) through bar 102 and bell crank lever 103.

*Circuit diagram*

In the illustration of the circuit diagram for the sorting machine a simplified conventional form has been chosen, as generally used in the art of communication. If units such as clutching magnets and brushes frequently occur, only one of them is shown in the diagram while the remainder are indicated by the distribution connections only. The relays and magnets are designated by capital letters and the contacts which they actuate by the corresponding small letters. Manually actuated contacts are characterized by a key like hook on the upper end of the movable contact member. Generally, the designations for the magnets, relays and contacts are so arranged that the characters are to the right or above the wiring symbol respectively, as far as they do not influence clarity. The contacts are shown in the position which they occupy when the machine is at rest.

If the machine is switched on, current may flow from negative through the contact $m$, the card lever contact $k$ and the time contact $t$ through the motor M to positive. The motor starts to run and will feed cards to the sorting brushes. Shortly after the first card has reached the sorting brushes it will actuate the card lever which will shift its contact $k$. The current to the motor will therefore flow no longer through the time contact $t$ but through the card lever contact $k$. The time contact $t$ will be referred to later on again since the same is necessary in order to feed the last card to the magazine after the card lever and therewith its contact $k$ have returned to their rest position.

The circuit has been illustrated in such manner that a column of the upper deck is assorted in the sorting run 0 to 4. Upon movement of the first card to the analyzing device it will first pass the position-checking brushes $pb^{11}$ and $pb^{21}$ one by one, then the sorting brushes and finally the brushes $pb^{12}$, $pb^{22}$ one by one. This, however, has no influence upon the machine as long as the current circuit to the analyzing device is still interrupted by the card lever contact $k$. Now, if the leading edge of the card has reached the middle of the sorting brushes the card lever contact $k$ will shift so that current can flow from negative through the contacts $m$, $k$, through the brushes $pb^{12}$ or $pb^{22}$ through the contact $u_{II}$ through the relay A to positive. The relay will respond, will open the contacts $a_I$ and $a_{II}$ and will close the contact $a_{III}$. Current can, however, not yet flow to the magnet W since through the card the contact through the brush $pb^{11}$ or $pb^{21}$ respectively is interrupted. If the card has reached the analyzing position for the upper deck as illustrated in Fig. 20, the brush $pb^{21}$ will slide from the card and will establish the current circuit through the contact plate. Now, current may flow from negative through the contacts $m$, $k$, the brush $pb^{21}$, the contacts $u_I$, $a_{III}$, $f_{II}$, through the brush $b$ which has passed through a hole, to the associated magnet W to positive. The energized magnet W will close its contact $w$. In the meantime the card has interrupted the contact at the brush $pb^{22}$ and therewith the current circuit through the relay A so that the latter will drop, and its contacts $a_I$ to $a_{III}$ may again return to home position. Thereby the holding circuit through the magnet W will be closed. Contact $a_I$ being already closed if $a_{III}$ opens, no interruption of the current flow through the magnet W will occur. Current will flow from negative through the contacts $m$, $k$, $a_I$, $h_{II}$, $w$, through the magnet W to positive. This current circuit will be maintained until the brush $pb^{22}$ slides off the card and the current circuit re-establishes itself through the relay A. The latter will drop, will open its contact $a_I$ and will thereby interrupt the holding circuit. The magnet W will drop and all sorting magnets are ready for the next card, which is already at a short distance from the analyzing position. In the meantime the card just analyzed has reached the card deflectors and has been fed between them.

If in the illustrated setting for a 0 to 4 sorting run there is a 5-hole in the VI-position of the analyzed column in addition to a perforation in the positions I to V, as soon as the brush $pb^{21}$ encounters the contact plate current will flow, as before, from the latter through the contacts $u_I$, $a_{III}$, $f_{II}$, the brush $b$, through the selector magnet W which will respond. Furthermore, current will also flow through the brush $b^6$, the contact $f_I$, through the relay H to positive which relay H will be energized and will actuate its contacts $h$ thereby opening $h_{II}$. Thereby the holding circuit for the selector magnets will be interrupted through the contact $h_{II}$ so that the latter will drop after contact $a_{III}$ has opened. Dropping of the selector magnet will occur shortly after the analysis and before the card has reached the card deflectors so that the card not belonging to the selected sorting run and having an overhole will be fed to the reject pocket. The relay H will not drop immediately since it is held by a holding circuit through the contacts $a_{II}$ and $h_I$. It is only if relay A is energized again that it will interrupt the holding circuit by means of its contact $a_{II}$ so that relay H will drop.

Now if cards having the values 5 to 9 are to be sorted, the machine is shifted to the second sorting run by means of contacts $f_I$ and $f_{II}$. Thereby the contact $f_I$ will be opened and the contact $f_{II}$ is shifted to the right. Now, current can flow to the brushes $b^1 \cdots {}^5$ only through the brush $b^6$ provided that the cards have a 5-hole. With cards perforated in a different manner, the contact over brush $b^6$ is interrupted so that no current can flow over the brushes $b^1 \cdots {}^5$ to the selector magnets $W^1 \cdots {}^5$ so that the cards will run to the reject pocket.

Heretofore it has been assumed that a column of the lower deck has been chosen for sorting (analyzing position Fig. 7). Now, if the machine is set to operate on a column of the upper deck, the two shift contacts $u_I$ and $u_{II}$ are shifted whereby the second set of position checking brushes $pb^{11}$ and $pb^{12}$ will be included in the circuit. The electrical controlling operations for sorting will then remain the same as described above with the only difference that they take place at a somewhat earlier moment; upon deenergization of the sorting magnet W the card is also already between the sorting deflectors but not so far as in sorting according to the lower deck which, however, has no influence upon the operation and the efficiency of the machine.

As soon as the last card has passed the sorting brushes the card lever will return to its home position and therewith also its contact $k$. Thereby all current circuits through the analyzing means will be interrupted and the current to the motor will flow through the time contact $t$. The time contact $t$ is preferably constructed as thermo contact and opens after a predetermined time. The opening time of the contact is adjusted in such manner that within this time the last card can reach the last magazine. At the end of this delay the thermo contact will open and will stop the machine. For restarting the switch is first temporarily opened and then closed again.

If the magazine is filled and the card support has reached the lowest position the contact $m$ will be opened as has been described whereby also all current circuits will be interrupted and thereby the machine will be stopped.

Braking device for increasing the analyzing period

The feed speed and therewith the sorting efficiency are dependent on the size of the holes and the time of response of the selector magnets. Since the time of response of the selector magnets is given usually predetermined, the sorting efficiency is determined by the size of the holes. Now, in the present as well as in similarly operated record card controlled machines mentioned in the introduction, analysis takes place only for a short period, usually when all hole positions of a column are under their analyzing brushes. It is by this feature that these machines are particularly distinguished from other machines, for instance from machines operating according to the "single hole" system wherein analysis of all positions takes place position by position. Accordingly, in the present instance according to the invention it is possible to cause fast running of the card feed or the card respectively and to reduce the speed only during the short period of the analysis which is necessary for the response of the relays or the selector magnets respectively. After that the card may again be fed fast. In this manner the efficiency of machines of this type can be considerably increased, particularly also the sorting efficiency of the sorting machine illustrated herein as an example.

Reduction of the speed is effected by a magnet which is controlled by the card itself just the same as the analyzing device, so that the machine remains free from any synchronism. Control is effected by a brake magnet brush specially arranged. The additional devices necessary for the increase of the sorting efficiency may be seen from Figs. 21 to 23.

The drive of the worm shaft 111 (it corresponds to the shaft 87 in the previously described machine) takes place from the motor 86 through the friction clutch and a belt pulley. A belt pulley 112 is rotatably mounted on a sleeve 113 which, with two disks 114 and 115 is fixed by means of a nut 116 to the worm shaft 111. A spring 117 presses the belt pulley 112 towards the disk 115. The pressure of the spring is so proportioned that upon a certain resistance the belt pulley 112 will slide with respect to disk 115 or the shaft 111 respectively. The shaft 111 is mounted in an angle 119 by means of box 118, the angle being screwed to the rear wall of the machine. Upon the worm shaft 111 is also fastened a brake disk 121. A brake block 122 mounted on an armature 123 may be pressed against disk 121. The armature 123 is mounted upon a magnet yoke 124 and attracted by the braking magnet B. If the magnet B is energized the brake block 122 presses upon disk 121 thereby causing a braking action and causing the belt pulley 112 to slide with respect to the disk 115. The braking power is chosen in such way that nevertheless the shaft will continue to run at a reduced speed and hence the card feed will not be interrupted but will only be slowed down.

In order to avoid braking the entire mass of the feed rollers a special clutch with play has been provided for the drive of the rollers towards the sorting deflectors. The rollers behind the sorting deflector openings are driven by shaft 125 which is connected to shaft 111 through a resilient clutch. This consists of a sleeve 126 into which extend the two shafts. In the sleeve there are provided two slots into which extend two pins 127. The two pins are fast in the shafts 111 and 125. If shaft 111 is braked it will be held back with respect to the shaft 125 which will continue to run due to its inertia until it is again rotated by the shaft 111.

The control of the magnet B is effected through the brush $sb^1$ for the lower deck and the brush $sb^2$ for the upper deck. The brush $sb^1$ is fastened together with the brush $pb^{11}$ in a holder 128 and the brush $sb^2$ together with the brush $pb^{21}$ in a holder 129. The brushes are supplied with current through angles 131 and 132. The position of the brushes $sb^1$ and $sb^2$ with respect to the other brushes has been determined in such manner that magnet B will receive current through these brushes if the card is ahead of the analyzing device by the distance of one hole position. The feed may then easily be slowed down until the moment of the analysis. Interruption of the current circuit through the magnet B takes place if the analysis is finished.

Fig. 23 shows the modification of the circuit diagram according to Fig. 19 which is required for the braking device. If the edge of the card passes below the brushes $sb^1$ or $sb^2$ respectively, current will flow from negative through the contact $u_I$, the brush $sb^1$ or $sb^2$ respectively, the contact $a_{IV}$ which is already closed at this moment as has already been described, through the magnet B to positive. The latter will respond and will brake the card feed. Shortly after this the card edge will pass under the brush $pb^{11}$ or $pb^{21}$ respectively whereby the analysis proper will be started as has also already been described. If the analysis is finished the current circuit through the A-relay will be interrupted through the brushes $pb^{12}$ or $pb^{22}$ respectively so that the contacts of said relay will return to rest position. Thereby also the current circuit through the $a_{IV}$-contact and the braking magnet B will be interrupted so that the latter will drop and braking ceases. The contact $u_I$ is used for the deck selection as has already been described and serves in this instance at the same time also for the deck selection of the brake magnet brushes.

I claim:

1. In a record card sorting machine, in combination, a plurality of sorting pockets, analyzing means which forms part of an electrical circuit for analyzing index marks provided in index positions of a card column and analyzing simultaneously all index positions of a column, a sorting mechanism controlled by said analyzing means and including a sorting magnet and blade for each pocket, each magnet having a winding connected in said electrical circuit to the means for analyzing the index marks, said magnets governing the operation of the blades for guidance of the cards into the pockets determined by the index marks, means for feeding the cards in motion past said sorting mechanism controlling analyzing means, position checking means connected to the means for analyzing the index marks in said circuit and responsive to the position of the card relative to said sorting mechanism controlling analyzing means while the card is in motion, said position checking means being constructed so as to render said sorting mechanism controlling analyzing means instantaneously responsive to said index marks when the index positions of a column are under said sorting mechanism controlling analyzing means to energize a sorting magnet, means connected to the winding of said magnet for holding the circuit of the sorting magnet energized and means connected as a part of said holding means to interrupt said holding circuit, said interrupting means being under the control of said position checking means and interrupting the holding circuit when the card has been guided in the path to the appropriate sorting pocket.

2. In a record card sorting machine as set forth in claim 1, said blades being in the form of flat metal sheets arranged one above the other on one side of the card feeding path only; said sorting blades serving for a portion of their width for card guiding and having their remaining portions terminating in staggered relation one above the other.

3. In a record card sorting machine as set forth in claim 1, wherein the sorting mechanism controlling analyzing means are adjustable column by column in a direction at right angles to the direction of travel of the card and wherein the position checking analyzing means is fixed rigidly to the side wall of the machine and searches over the lateral non-marked margin of the card.

4. In a record card sorting machine as set forth in claim 1, wherein the armatures of the sorting magnets act on the ends of the sorting blades; said blades being arranged in staggered relation one above the other so that upon energization of a sorting magnet the end of the blade associated therewith and the ends of the blades lying above said associated blade are raised to provide a sorting opening between the sorting blades.

5. In a record card sorting machine, in combination, a plurality of sorting pockets, analyzing means which forms part of an electrical circuit for analyzing index marks provided in index positions of a card column and analyzing simultaneously all index positions of a column, a sorting mechanism controlled by said analyzing means and including a sorting magnet and blade for each pocket, each magnet having a winding connected in said electrical circuit to the means for analyzing the index marks, said magnets governing the operation of the blades for guidance of the cards into the pockets determined by the index marks, means for feeding the cards in motion past said sorting mechanism controlling analyzing means, position checking means connected to the means for analyzing the index marks in said circuit and responsive to the position of the card relative to said sorting mechanism controlling analyzing means while the card is in motion, said position checking means being arranged so as to analyze the imperforate margin of the card and constructed so as to render said sorting mechanism controlling analyzing means instantaneously responsive to said index marks when the index positions of a column are under said sorting mechanism controlling analyzing means to energize a sorting magnet, means connected to the winding of said magnet for holding the circuit of the sorting magnet energized and means connected as a part of said holding means to interrupt said holding circuit, said interrupting means being under the control of said position checking means and interrupting the holding circuit when the card has been guided in the path to the appropriate sorting pocket.

6. A sorting machine as specified in claim 5, wherein said position checking means comprise a pair of analyzing brushes spaced apart for the distance of the width of the card in the feeding direction and so arranged relatively to the sorting mechanism controlling analyzing means that the index positions of the card are under said last named analyzing means if the card is between said pair of position responsive analyzing brushes.

7. In a record card sorting machine, in combination, a plurality of sorting pockets, analyzing means which forms part of an electrical circuit for analyzing index marks provided in index positions of a card column in multiple deck record cards, said analyzing means being common to all decks and analyzing simultaneously all index positions of a card column, a sorting mechanism controlled by said analyzing means and including a sorting magnet and blade for each pocket, each magnet having a winding connected in said electrical circuit to the means for analyzing the index marks, said magnets governing the operation of the blades for guidance of the cards into the pockets determined by the index marks, means for feeding the cards in motion past said sorting mechanism controlling analyzing means, position checking means associated with each deck and connected to the means for analyzing the index marks in said circuit and responsive to the position of the card relative to said sorting mechanism controlling analyzing means while the card is in motion, said position checking means being constructed so as to render said sorting mechanism controlling analyzing means instantaneously responsive to said index marks when the index positions of a column are under said sorting mechanism controlling analyzing means to energize a sorting magnet, deck selection means in said circuit for selectively rendering the position checking means corresponding to the selected deck responsive to a column in the selected deck, means connected to the winding of said magnet for holding the circuit of the sorting magnet energized and means connected as a part of said holding means to interrupt said holding circuit, said interrupting means being under the control of said position checking means and interrupting the holding circuit when the card has been guided in the path to the appropriate sorting pocket.

8. In a machine for multiple deck record cards as specified in claim 7, a set of sorting mechanism controlling analyzing brushes common to all decks of the card, a pair of position responsive analyzing brushes for each record deck, the brushes in each pair being spaced apart by the width of the card in feeding direction and each pair of brushes being so arranged relatively to said sorting mechanism controlling analyzing means that said last named analyzing means analyze a column of a record deck if the card is between the pairs of position analyzing brushes associated with said deck.

9. In a record card sorting machine as set forth in claim 7, wherein the position checking means for each deck are offset relatively to each other in such a manner that the selected record deck is below the common sorting mechanism-controlling analyzers when the selected position checking analyzing means become effective.

10. In a record card sorting machine, in combination, a plurality of sorting pockets, analyzing means which forms part of an electrical circuit for analyzing index marks provided in index positions of a card column and analyzing simultaneously all index positions of a card column, a sorting mechanism controlled by said analyzing means and including a sorting magnet and blade for each pocket, each magnet having a winding connected in said electrical circuit to the means for analyzing the index marks, said magnets governing the operation of the blades for guidance of the cards into the pockets determined by the index marks, means for feeding the cards in motion past said sorting mechanism controlling analyzing means; position checking means connected to the means for analyzing the index marks in said circuit and responsive to the position of the card relative to said sorting mechanism controlling analyzing means while the card is in motion, said position checking means being constructed so as to render said sorting mechanism controlling analyzing means instantaneously responsive to said index marks when the index positions of a column are under said sorting mechanism controlling analyzing means to energize a sorting magnet, means connected to the winding of said magnet for holding the circuit of the sorting magnet energized and braking means also connected in said circuit under the exclusive control of the card itself and also responsive to the position of the card relative to said sorting mechanism controlling analyzing means for slowing down the feeding speed of said feeding means during the period of analysis by said analyzing means controlling the sorting mechanism.

11. A machine as specified in claim 10, wherein said card controlled means for slowing down the feeding speed of the feeding mechanism include analyzing brushes analyzing an imperforate margin of the card, feeding rollers for the cards, a friction drive for said feeding rollers, a magnet adapted to brake the feeding speed of said feeding rollers upon energization, said braking magnet being under the control of said card controlled analyzing means for slowing down the feeding speed.

12. In a record card sorting machine as set forth in claim 10, wherein the braking means is temporarily made effective shortly before the card reaches the predetermined analyzing position detected by the position checking analyzing means; said braking means braking the card feeding means during the motion of the card under the sorting mechanism controlling analyzers and said interrupting means being then also automatically de-energized under card control.

13. In a record card sorting machine, in combination, a plurality of sorting pockets, analyzing means which forms part of an electrical circuit for analyzing index marks provided in index positions of a card column and analyzing simultaneously all index positions of a column, a sorting mechanism controlled by said analyzing means and including a sorting magnet and blade for each pocket, each magnet having a winding connected in said electrical circuit to the means for analyzing the index marks, said magnets governing the operation of the blades for guidance of the cards into the pockets determined by the index marks, means for feeding the cards in motion past said sorting mechanism controlling analyzing means, position checking means connected to the means for analyzing the index marks in said circuit and responsive to the position of the card relative to said sorting mechanism controlling analyzing means while the card is in motion, said position checking means being constructed so as to render said sorting mechanism controlling analyzing means instantaneously responsive to said index marks when the index positions of a column are under said sorting mechanism controlling analyzing means to energize a sorting magnet, means connected to the winding of said magnet for holding the circuit of the sorting magnet energized and braking means also connected in said circuit under the exclusive control of the card itself and said deck selection means and also responsive to the position of the card relative to said sorting mechanism controlling analyzing means for slowing down the feeding speed of said feeding means during the period of analysis of a column in the selected deck by said analyzing means controlling the sorting mechanism.

References Cited in the file of this patent

UNITED STATES PATENTS

| | | |
|---|---|---|
| 2,000,214 | Campbell | May 7, 1935 |
| 2,034,107 | Mansel | Mar. 17, 1936 |
| 2,053,068 | Daly | Sept. 1, 1936 |
| 2,097,764 | Jacob | Nov. 2, 1937 |
| 2,107,008 | Lasker | Feb. 1, 1938 |
| 2,265,440 | Maul | Dec. 9, 1941 |
| 2,618,386 | Samain | Nov. 18, 1952 |